United States Patent
Jang et al.

(10) Patent No.: US 8,463,474 B2
(45) Date of Patent: Jun. 11, 2013

(54) METHOD AND SYSTEM FOR CONTROLLING MOTOR TORQUE IN HYBRID VEHICLES

(75) Inventors: Jihoon Jang, Torrance, CA (US); Bon Ho Bae, Torrance, CA (US); Wei D. Wang, Troy, MI (US); Jeong J. Park, Ann Arbor, MI (US); Harry J. Bauer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 12/784,758

(22) Filed: May 21, 2010

(65) Prior Publication Data

US 2011/0288698 A1 Nov. 24, 2011

(51) Int. Cl.
*B60L 11/00* (2006.01)
(52) U.S. Cl.
USPC .......................................................... 701/22

(58) Field of Classification Search
USPC ............................. 701/22; 180/65.28, 65.285
See application file for complete search history.

(56) References Cited

U.S. PATENT DOCUMENTS

2009/0118926 A1* 5/2009 Heap et al. ...................... 701/54

* cited by examiner

*Primary Examiner* — Faye M. Fleming
(74) *Attorney, Agent, or Firm* — Ingrassia Fisher & Lorenz, P.C.

(57) ABSTRACT

Methods and systems are provided for motor torque control for hybrid vehicles having a motor and a communications bus. The motor torque is controlled using a first motor torque capacity if the communications bus is healthy. The motor torque is controlled using a second motor torque capacity if the communications bus is unhealthy. The first motor torque capacity has a first absolute value. The second motor torque capacity has a second absolute value that is less than the first absolute value.

20 Claims, 4 Drawing Sheets

METHOD AND SYSTEM FOR CONTROLLING MOTOR TORQUE IN HYBRID VEHICLES

TECHNICAL FIELD

The present invention generally relates to the field of hybrid vehicles and, more specifically, to methods and systems for controlling motor torque in hybrid vehicles.

BACKGROUND OF THE INVENTION

Many automobiles today are hybrid vehicles that utilize two or more propulsion systems. For example, certain hybrid vehicles (often referred to as mild hybrid vehicles) utilize an electric motor and battery to assist an internal combustion engine for operation of the vehicle. Other hybrid vehicles (often referred to as full hybrid vehicles) have separate propulsion systems (namely, an electric motor and battery propulsion system and an internal combustion engine propulsion system) that can assist one another or operate independently from one another depending on the circumstances for operation of the vehicle. Yet other hybrid vehicles (often referred to as plug-in hybrid vehicles) predominantly utilize an electric motor and battery propulsion system for operation of the vehicle, but also have a back-up internal combustion engine propulsion system for use when necessary.

Motor torque for hybrid vehicles is typically controlled based on electric feedback current provided by an electric current sensor of the vehicle. Typically, the hybrid system is turned off if the electric current sensor is unhealthy or if there is uncertainty as to whether the electric current sensor is healthy. However, such action may not always be optimal, for example, if the feedback current is typically provided along a communications bus and the bus is unhealthy.

SUMMARY

In accordance with an exemplary embodiment, a method for controlling motor torque in a hybrid vehicle having a motor and a communications bus is provided. The method comprises the steps of controlling the motor torque using a first motor torque capacity if the communications bus is healthy, and controlling the motor torque using a second motor torque capacity if the communications bus is unhealthy. The first motor torque capacity has a first absolute value. The second motor torque capacity has a second absolute value that is less than the first absolute value.

In accordance with another exemplary embodiment, a method for controlling motor torque in a hybrid vehicle having a motor and a communications bus is provided. The method comprises the steps of generating a bus determination as to whether the communications bus is healthy, determining a motor torque capacity using the bus determination, and controlling the motor torque using the motor torque capacity.

In accordance with a further exemplary embodiment, a system for controlling motor torque in a hybrid vehicle having a motor and a communications bus is provided. The system comprises a processor and an inverter. The processor is configured to be coupled to the communications bus, and is further configured to provide signals for controlling a motor torque for the motor using a first motor torque capacity if the communications bus is healthy, and using a second motor torque capacity if the communications bus is unhealthy. The first motor torque capacity has a first absolute value. The second motor torque capacity has a second absolute value that is less than the first absolute value. The inverter is in operable communication with the processor, and is configured to provide the motor torque in accordance with the signals provided by the processor.

Furthermore, other desirable features and characteristics of the methods and systems will be apparent from the subsequent detailed description and the appended claims, taken in conjunction with the accompanying drawings and the foregoing technical field and background.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention.

Figure 1:
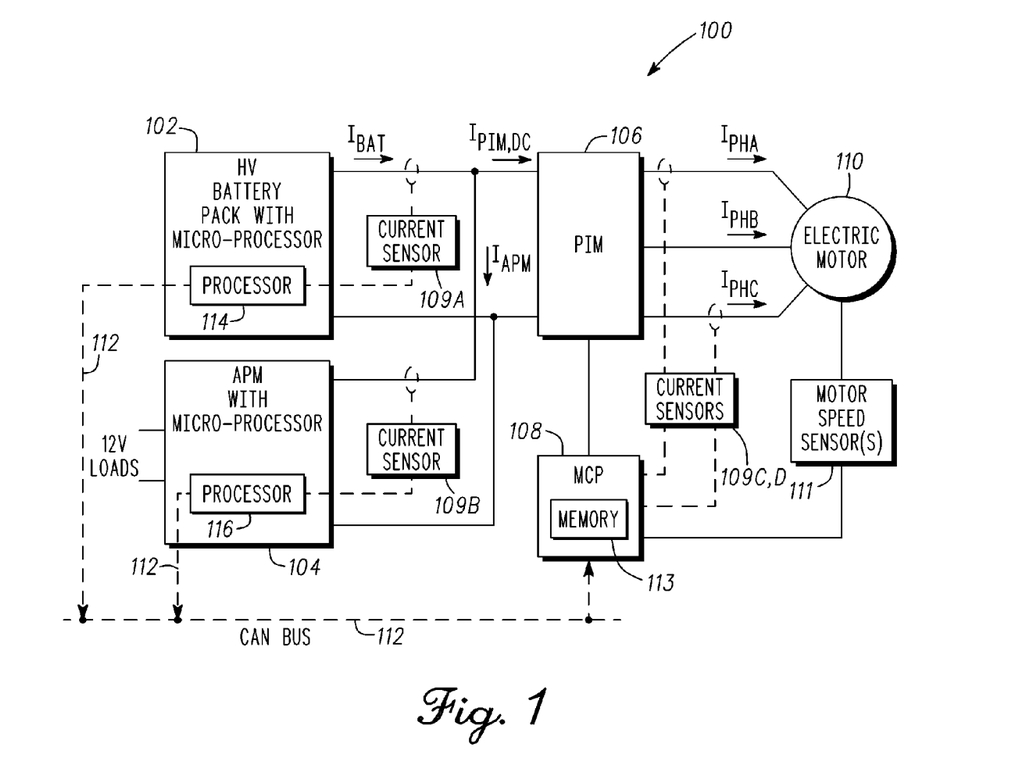
FIG. 1 is a block diagram of an exemplary system for controlling motor torque and propulsion for a hybrid vehicle, such as an automobile, in accordance with an exemplary embodiment.

FIG. 1 is a block diagram of an exemplary system 100 for controlling motor torque and propulsion for a hybrid vehicle, in accordance with an exemplary embodiment. The system 100 allows for optimized motor torque control for the hybrid vehicle using a variable motor torque capacity depending on whether a communications bus 112 is healthy. The system 100 preferably comprises a power train for an automobile, such as a sedan, a sport utility vehicle, a van, or a truck. However, this may vary, for example in that the system 100 may also be used in other types of hybrid vehicles.

As depicted in FIG. 1, the system 100 comprises a battery unit 102, an accessory power module (APM) unit 104, a power inverter module (PIM) 106, a motor control processor (MCP) 108, current sensors 109, an electric motor 110, one or more motor speed sensors 111, and the communications bus 112 (referenced above). The battery unit 102 preferably comprises a high voltage (HV) battery pack. The battery unit 102 provides high voltage power for both the APM unit 104 and the PIM 106. The battery unit 102 also includes a processor 114 that processes feedback current from one of the current sensors 109(A) and provides processed results therefrom to the MCP 108 for further processing, as described below.

The APM unit 104 is an electric current converter, and is coupled between the battery unit 102 and the PIM 106. The APM unit 104 is preferably a direct current (DC) to direct current (DC) converter. The APM unit 104 converts the high voltage power received from the battery unit 102 to a lower voltage power (preferably, having twelve volt loads) therefrom. The APM unit 104 supplies the lower voltage power to the PIM 106. The input and output of the APM unit 104 are both direct current (DC). The APM unit 104 also includes a processor 116 that processes feedback current from one of the current sensors 109(B) and provides processed results therefrom to the MCP 108 for further processing, as described below.

The PIM 106 is an inverter, and is coupled between the battery unit 102, the APM unit 104, the MCP 108, and the electric motor 110. The PIM 106 and the APM unit 104 are preferably connected in parallel. Accordingly, a portion of the high voltage power from the battery unit 102 is provided directly to the APM unit 104, while another portion of the high voltage power from the battery unit 102 is provided directly to the PIM 106. The PIM 106 receives high voltage power from the battery unit 102 and lower voltage power (preferably, having twelve volt loads) form the APM unit 104. The PIM 106 generates and provides electric power to the electric motor 110. The electric power 110 produces motoring torque to assist the internal combustion engine, or regenerating torque to charge the battery unit 102, depending on the vehicle operation status.

Various current sensors 109 are depicted in FIG. 1. Each current sensor 109 comprises an electric current sensor. One current sensor 109(A) is coupled to the battery unit 102. Current sensor 109(A) measures current from the battery unit 102, and provides feedback current to the processor 114 of the battery unit 102 for processing. An additional current sensor 109(B) is coupled to the APM unit 104. Current sensor 109 (B) measures current from the APM unit 104 and provides feedback current to the processor 116 of the APM unit 104 for processing. Two additional current sensors 109(C) and 109 (D) are coupled between the PIM 106 and the MCP 108. Current sensors 109(C) and 109(D) measure current from the PIM 106 and provide feedback current to the MCP 108 for processing.

The motor speed sensors 111 are coupled between the electric motor 110 and the MCP 108. The motor speed sensors 111 measure a speed of the electric motor 110, and provide signals and/or information pertaining thereto to the MCP 108 for processing. The motor speed sensors 111 may comprise a single motor speed sensor or any number of multiple motor speed sensors.

The MCP 108 is coupled directly or indirectly between the communications bus 112, the various current sensors 109, the one or more motor speed sensors 111, and the PIM 106. Specifically, the MCP 108 is coupled to the processor 114 of the battery unit 102 and the processor 116 of the APM unit 104 via the communications bus 112, and receives and processes the various feedback current results provided therefrom with respect to current sensors 109(A) and 109(B), respectively.

The MCP 108 is also coupled to receive feedback currents directly from current sensors 109(C) and 109(D). The MCP 108 processes the various feedback currents and/or results pertaining thereto, and determines whether there are any errors or faults in the current sensors 109, for example if one or more of the current sensors 109 are not healthy. The current sensors 109 are determined to be healthy if their respective current values are consistent with one another, as described in greater detail below in connection with the performance diagnostic algorithm described further below in connection with FIG. 5.

In addition, the MCP 108 determines whether the communications bus 112 is healthy. For example, the communications bus 112 may be deemed to be healthy if the MCP 108 continuously receives current feedback results along the communications bus 112 and the communications bus 112 is otherwise healthy. Conversely, the communications bus 112 may be deemed to not be healthy if the MCP 108 does not continuously receive current feedback results along the communications bus 112, and/or if there is some other abnormality detected with respect to the communications bus 112 indicating that the communications bus 112 is unhealthy (i.e., that the communications bus 112 is not operating properly). The condition of communication bus 112 can be monitored by checking of the update of its message rolling count and/or by checking the checksum of its communication messages, by way of example.

The MCP 108 is further coupled to receive signals of the electric motor speed or information pertaining thereto directly from the motor speed sensors 111. The MCP 108 processes the motor speed information. The MCP 108 determines a motor torque capacity or limit based on the motor speed, an operational mode of the vehicle (specifically, whether the vehicle is in a torque assist/motoring mode or a regenerative mode), and a determination of whether the communications bus 112 is healthy (i.e., whether the communications bus 112 is operating properly).

The MCP 108 uses the feedback currents from the current sensors 109, the determination as to whether the communications bus 112 is healthy, and the motor torque capacity to determine an optimal motor torque for the system 100. The MCP controls and modifies the motor torque for the system 100 based on the optimal motor torque. Specifically, the MCP 108 provides pulse width modulation (PWM) signals to the PIM 106 that result in the PIM 106 providing the optimal electric power to the electric motor 110.

The pulse width modulation signals provided from the MCP 108 to the PIM 106 vary based in part on the determination as to whether the communications bus 112 is healthy. If the communications bus 112 is unhealthy, the MCP 108 controls the motor torque with pulse width modulation signals provided to the PIM 106 that reflect a reduced motor torque capacity corresponding to a safe range of operation for the vehicle. The MCP 108 performs these steps in accordance with the process 200 described further below in connection with FIGS. 2-5.

The MCP 108 preferably comprises or is coupled to a memory 113. The memory 113 stores a relationship (such as a formula or a look-up table) relating the speed of the electric motor 110 and a mode of operation of the system 100 (specifically, a torque assist/motoring operating mode or a regenerative operating mode) as inputs and an optimal motor torque capacity (which serves as an upper limit for motor torque) as an output. The memory 113 can be any type of suitable memory including, without limitation, various types of dynamic random access memory (DRAM) such as SDRAM, various types of static RAM (SRAM), and various types of non-volatile memory (PROM, EPROM, and flash). The memory 113 may reside and/or be located on the same chip as the MCP 108 and/or may be a component of the MCP 108. Alternatively, the memory 113 may otherwise be coupled to the MCP 108.

The MCP 108 preferably performs the computation and control functions of the system 100, and may comprise any type of processor or multiple processors, single integrated circuits such as a microprocessor, or any suitable number of integrated circuit devices and/or circuit boards working in cooperation to accomplish the functions of a processing unit. During operation, the MCP 108 may execute one or more programs contained within a memory (not depicted) in controlling the operation of the system 100, preferably in executing various steps of the process 200 and various sub-processes as depicted in FIGS. 2-5 and described further below in connection therewith.

The electric motor 110 is coupled to the PIM 106, and utilizes power received from the PIM 106. The electric motor 110 is also preferably coupled to and powers an engine or a transmission of the vehicle (not depicted). Specifically, the electric motor 110 provides assistive torque to the engine and the transmission while during torque assist or motoring operation of the system 100. In addition, the electric motor 110 generates regenerative torque and provides the regenerative torque to the transmission during regenerative operation of the system 100.

In the depicted embodiment, the communications bus 112 is coupled to the battery unit 102 (specifically, to the processor 114 thereof), the APM unit 104 (specifically, the processor 116 thereof), and the MCP 108. The communications bus 112 facilitates transfer of the electric feedback current results thereon from the processor 114 of the battery unit 102 and the processor 116 of the APM unit 104 to the MCP 108. The communications bus 112 preferably comprises a CAN bus. However, it will be appreciated that the communications bus 112 may comprise various other types of communications buses, communications connections, and/or other communications devices and/or systems. It will similarly be appreciated that the communication bus 112 can be similarly coupled to any other unit/processor in the vehicle (not depicted), in addition to or independent from the units and processors depicted in FIG. 1.

Figure 2:
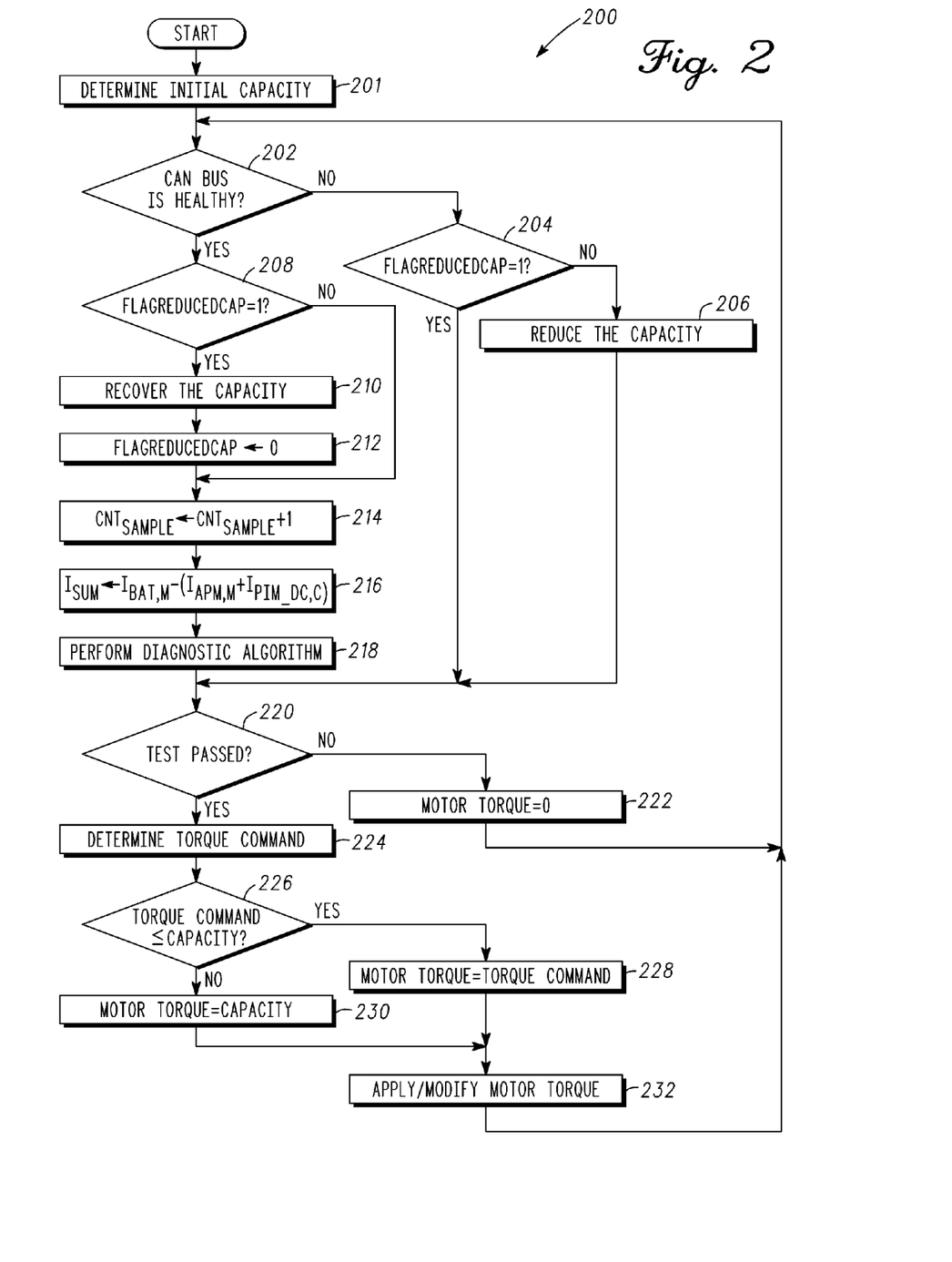
FIG. 2 is a flowchart of a process for controlling motor torque for a hybrid vehicle, and that can be utilized in connection with the system of FIG. 1, in accordance with an exemplary embodiment.

FIG. 2 is a flowchart of a process 200 for controlling motor torque for a hybrid vehicle, in accordance with an exemplary embodiment. The process 200 allows for optimized motor torque control that accounts for situations in which a communications bus is offline or otherwise unhealthy. Specifically, the process 200 controls or modifies the motor torque using a reduced motor torque capacity when the communications bus is unhealthy. The process 200 can be utilized in connection with the system 100 of FIG. 1 in controlling the motor torque provided by the PIM 106 to the electric motor 110 via pulse width modulation signals provided by the MCP 108 to the PIM 106.

Figure 3:
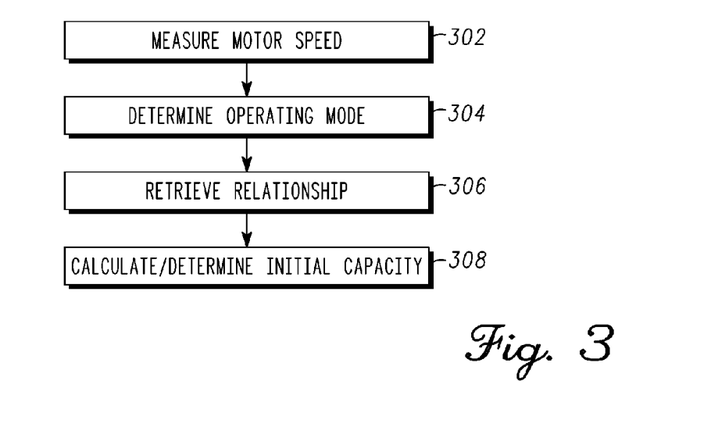
FIG. 3 is a flowchart of a sub-process of the process of FIG. 2, namely a sub-process for determining a torque capacity for the motor torque control, in accordance with an exemplary embodiment.

The process 200 begins with a determination of an initial motor torque capacity (step 201). FIG. 3 depicts an exemplary embodiment of step 201 in accordance with an exemplary embodiment. A motor speed is measured (step 302). The motor speed is preferably measured by the one or more motor speed sensors 111 of FIG. 1 with respect to the electric motor 110 of FIG. 1, and signals representative thereof are provided to the MCP 108 of FIG. 1.

In addition, an operating mode is determined (step 304). Specifically, a determination is made as to whether the system 100 of FIG. 1 is in a torque assist/motoring operating mode (in which torque is provided by the system 100 for propulsion of the vehicle) or a regenerative operating mode (in which regenerative energy is generated or captured by the system 100). This determination is preferably made by the MCP 108 of FIG. 1.

A relationship is retrieved (step 306). The relationship relates the motor speed and the operating mode to the optimal motor torque capacity. The relationship may comprise a formula, a look-up table, and/or one or more other types of relationships relating the motor speed and the operating mode as inputs to the optimal motor torque as an output. The relationship is preferably retrieved by the MCP 108 of FIG. 1 from the memory 113 of FIG. 1 that resides and/or is co-located on a same chip as the MCP 108 and/or that is otherwise coupled to the MCP 108.

The initial motor torque capacity is then calculated or determined (step 308). The initial motor torque capacity is preferably calculated or determined by the MCP 108 of FIG. 1 using the motor speed of step 302, the operating mode of step 304, and the relationship of step 306.

Figure 4:
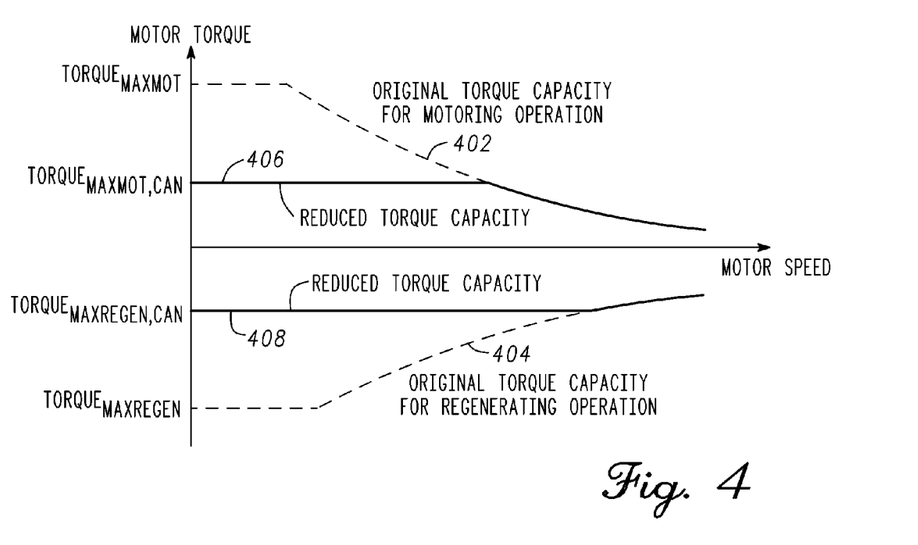
FIG. 4 is a graphical representation of various motor torque capacities that can be used in connection with the process of FIG. 2 and the sub-process of FIG. 3, in accordance with an exemplary embodiment.

FIG. 4 provides a graphical representation of the torque capacity calculation or determination in accordance with an exemplary embodiment. FIG. 4 depicts (i) a full motoring torque capacity 402 (represented as $Torque_{MaxMot}$ in FIG. 4) for use when the communications bus 112 of FIG. 1 is healthy and the system 100 is in a torque assist or motoring operating mode; (ii) a full regenerative capacity 404 (represented as $Torque_{MaxRegen}$ in FIG. 4) for use when the communications bus 112 of FIG. 1 is healthy and the system 100 is in a regenerative operating mode; (iii) a reduced motoring capacity 406 (represented as $Torque_{MaxMot,CAN}$ in FIG. 4) for use when the communications bus 112 of FIG. 1 is unhealthy and the system 100 is in a torque assist or motoring operating mode; and (iv) a reduced regenerative torque capacity 408 (represented as $Torque_{MaxRegen,CAN}$ in FIG. 4) for use when the communications bus 112 of FIG. 1 is unhealthy and the system 100 is in a regenerative operating mode. The reduced motoring torque capacity 406 and the reduced regenerative torque capacity 408 represent safe ranges in which the system 100 provides the necessary motor torque or power to operate the vehicle but also stays within a safe range of operation without operation of the communications bus at which the motor torque is unlikely to result in any damage to any vehicle systems or components. In one exemplary embodiment, one safe range is a range of values, such that values below the safe range may result in unintended acceleration of the vehicle, and another safe range is a range of values, such that values below the safe range may cause damage to the components and/or systems. In one such embodiment, a final safe range represents a minimum value from such multiple ranges, such that unintended acceleration of the vehicle and damage to the components and/or systems are both avoided.

As shown in FIG. 4, the full motoring torque capacity 402, the full regenerative torque capacity 404, the reduced motoring torque capacity 406, and the reduced regenerative torque capacity 408 each have respective constant values at low motor speeds that are less than respective predetermined speed thresholds. Specifically, (i) the full motoring torque capacity 402 is preferably equal to a first constant value when the speed is less than a first predetermined speed threshold; (ii) the full regenerative torque capacity 404 is preferably equal to a second constant value when the speed is less than a second predetermined speed threshold; (iii) the reduced motoring torque capacity 406 is preferably equal to a third constant value when the speed is less than a third predetermined speed threshold; and (iv) the reduced motoring torque capacity 406 is preferably equal to a third constant value when the speed is less than a fourth predetermined speed threshold.

The absolute value of the first constant value (corresponding to the full motoring torque capacity 402) and the absolute value of the second constant value (corresponding to the full regenerative torque capacity 404) are preferably at least substantially equal to one another. The first constant value may be equal to positive seventy Newton-meters (+70 Nm), and the second constant value may be equal to negative seventy Newton-meters (−70 Nm). However, this may vary.

The absolute value of the third constant value (corresponding to the reduced motoring torque capacity 406) and the absolute value of the fourth constant value (corresponding to the reduced regenerative torque capacity 408) are preferably at least substantially equal to one another, and are each preferably less than the absolute values of the first and second constant values. The third constant value may be equal to positive thirty Newton-meters (+30 Nm), and the fourth constant value may be equal to negative thirty Newton-meters (−30 Nm). However, this may vary.

The second predetermined speed threshold (corresponding to the full regenerative torque capacity 404) is preferably greater than the first predetermined speed (corresponding to the full motoring torque capacity 402). The third predetermined speed threshold (corresponding to the reduced motoring torque capacity 406) is preferably less than the fourth predetermined speed threshold (corresponding to the reduced regenerative torque capacity 408), and the third and fourth predetermined speed thresholds are both preferably less than the first and second predetermined speed thresholds. The first, second, third, and fourth predetermined speed thresholds may be equal to 2500, 3000, 4000, and 7000 revolutions per minute (rpm), respectively. However, this may vary.

The absolute values of the full motoring torque capacity 402, the full regenerative torque capacity 404, the reduced motoring torque capacity 406, and the reduced regenerative torque capacity 408 are inversely related to the motor speed after the motor speed exceeds their respective motor speed thresholds. Specifically, the full motoring torque capacity 402 is inversely related to the motor speed when the motor speed is greater than the first predetermined speed threshold, the full regenerative torque capacity 404 is inversely related to the motor speed when the motor speed is greater than the second predetermined speed threshold, the reduced motoring torque capacity 406 is inversely related to the motor speed when the motor speed is greater than the third predetermined speed threshold, and the reduced regenerative torque capacity 408 is inversely related to the motor speed when the motor speed is greater than the fourth predetermined speed threshold.

As shown in FIG. 4, the absolute values of the full motoring torque capacity 402 and the full regenerative torque capacity 404 are both greater than the absolute values of the reduced motoring torque capacity 406 and the reduced regenerative torque capacity 408 when the motor speed is less than the third predetermined speed threshold (for operating in the torque assist/motoring operating mode) or the fourth predetermined speed threshold (for operating in the regenerative operating mode), respectively. Per the discussion above, the third predetermined threshold is preferably less than the fourth predetermined threshold.

At relatively high motor speeds (for example, when the motor speed is greater than the fourth predetermined threshold), the absolute values of the full motoring torque capacity 402 and the reduced motoring torque capacity 406 are equal to one another, and the full regenerative torque capacity 404 and the reduced regenerative torque capacity 408 are preferably equal to one another, while the absolute values of the full motoring torque capacity 402 and the reduced motoring torque capacity 406 are less than the full regenerative torque capacity 404 and the reduced regenerative torque capacity 408.

Accordingly, a reduced motor torque capacity is used during torque assist/motoring operation of the system or vehicle when the motor speed is less than the third predetermined speed threshold, but not when the motor speed is greater than or equal to the third predetermined speed threshold. Similarly, a reduced motor torque capacity is used during regenerative operation of the system or vehicle when the motor speed is less than the fourth predetermined speed threshold, but not when the motor speed is greater than or equal to the fourth predetermined speed threshold.

As will be explained in greater detail further below, during this time, a communication bus health condition and a correlation of the signal currents are also monitored to ensure that there are no unreliable current sensors or signals in the system, based on an evaluation of a sum of the signal currents (per steps 216 and 218 of FIGS. 2 and 5, described further below). If there are any unreliable current sensors or signals in the system, a reduced torque capacity for the motor is triggered. This allows the process and system to optimally choose motor torque based on the system conditions such that optimal torque availability can be provided while avoiding torque insecurity.

Returning to FIG. 2, a determination is made as to whether a communications bus is healthy (step 202). This determination is made by the MCP 108 of FIG. 1 with respect to the communications bus 112 of FIG. 1. For example, the communications bus 112 may be deemed to be healthy if the MCP 108 continuously receives current feedback results along the communications bus 112 and the communications bus 112 is otherwise operating properly. Conversely, the communications bus 112 may be deemed to not be healthy if the MCP 108 does not continuously receive current feedback results along the communications bus 112, and/or if there is some other abnormality detected with respect to the communications bus 112 indicating that the communications bus 112 is unhealthy. The condition of communication bus 112 can be monitored by checking of the update of its message rolling count and/or by checking the checksum of its communication messages, by way of example.

If it is determined in step 202 that the communications bus is unhealthy, then a subsequent determination is made as to whether a motor torque capacity flag currently has a value equal to one (step 204). The motor torque capacity flag (denoted as FlagReducedCAP in FIG. 2) denotes whether the motor torque capacity (or limit) is currently reduced. The motor torque capacity is reduced during times in which the communications bus is unhealthy, as described above in connection with step 201, further below in connection with step 206, and in FIGS. 3 and 4. A value of one for the motor torque capacity flag denotes that the motor torque capacity is currently reduced. Conversely, a value of zero represents that the motor torque capacity is not currently reduced. This determination is preferably made by the MCP 108 of FIG. 1.

If it is determined in step 204 that the motor torque capacity flag is not equal to one (i.e., that the motor torque capacity flag is equal to zero), then the motor torque capacity is reduced (step 206). Specifically, the absolute value of the current motor torque capacity is reduced into a safe range when the communications bus is unhealthy (as determined in step 202) and the motor torque capacity has not already been reduced (as determined in step 204). The safe range represents a range of motor torque values in which the system provides the necessary motor torque or power to operate the vehicle but also stays within a safe range of operation at which the motor torque is unlikely to result in any damage to any vehicle systems or components.

The reduction in motor torque capacity is dependent upon the motor speed referenced above in connection with 302 of FIG. 3, the operating mode referenced above in connection with step 304 of FIG. 3, and the relationship referenced above in connection with step 306 of FIG. 4. With reference to FIG. 4, if the operating mode is the torque assist/motoring operating mode, the reduced motor torque capacity in step 206 is determined using the motor speed and the reduced motoring torque capacity 406 rather then the motor speed and the full motoring torque capacity 402. Conversely, if the operating mode is the regenerative operating mode, the motor torque capacity in step 206 is determined using the motor speed and the reduced regenerative torque capacity 408 rather then the motor speed and the full regenerative torque capacity 404. Per the discussion above, during step 206 the actual motor torque is reduced provided further that the motor speed is greater than the third predetermined speed threshold in the torque assist/motoring operating mode, and the fourth predetermined speed threshold in the regenerative operating mode.

The motoring torque capacity is preferably reduced by the MCP 108 of FIG. 1 during step 206. Following step 206, the process proceeds to step 220. Step 220 will be described further below.

Conversely, if it is determined in step 204 that the motor torque capacity flag is equal to one, then no reduction in the motor torque capacity is required. Rather, this determination indicates that the motor torque capacity has already been reduced in a prior iteration of step 206 or in the initial motor torque capacity determination of step 201. Accordingly, the process proceeds directly to step 220, described further below.

Returning now to step 202, if a determination is made that the communications bus is healthy, then a determination is made along a different path as to whether a motor torque capacity flag currently has a value equal to one (step 208). This determination is preferably made by the MCP 108 of FIG. 1.

If it is determined in step 208 that the motor torque capacity is equal to one, then the full motor torque capacity is restored or recovered (step 210). Specifically, if it is determined in step 208 that the motor torque capacity is equal to one, this represents that the torque capacity has already been reduced in a prior iteration of step 206 (as determined in step 208), but that the communications bus is currently healthy (as determined in step 202). Accordingly, the full motor torque capacity is restored or recovered during step 210.

With reference to FIG. 4, if the operating mode of the system or the vehicle is the torque assist/motoring operating mode, then the full motoring torque capacity 402 is restored or recovered in step 210. Conversely, if the operating mode of the system or the vehicle is the regenerative operating mode, then the full regenerative torque capacity 404 is restored or recovered in step 210. The recovery or restoration of the full motor torque capacity in step 210 is preferably conducted by the MCP 108 of FIG. 1.

In addition, the motor torque capacity flag is re-set to zero (step 212). This serves as an indication for subsequent iterations of the process that the full motor torque capacity is being utilized. The re-setting of the motor torque capacity flag in step 212 is preferably conducted by the MCP 108 of FIG. 1.

A sample count is also incremented (step 214). The sample count (referenced as $CNT_{sample}$) is incremented by one in step 214 for use in performing the diagnostic algorithm as described further below in connection with step 218 and FIG. 5. The sample count is preferably incremented in step 214 by the MCP 108 of FIG. 1.

A current sum value is also calculated (step 216). Specifically, a variable representing a sum of electric currents is calculated in step 216 in accordance with the following equation:

$$I_{sum} = I_{BAT,M} - (I_{APM,M} + I_{PIM\_DC,C}) \quad \text{(Equation 1)},$$

in which $I_{sum}$ represents the current sum value calculated in step 216, $I_{BAT,M}$ represents a measured value of electric current from the battery unit 102 of FIG. 1, $I_{APM,M}$ represents a measured value of electric current from the APM unit 104 of FIG. 1, and $I_{PIM\_DC,C}$ represents a calculated value of electric current from the PIM 106 of FIG. 1. The calculated value of electric current from the PIM 106 of FIG. 1 ($I_{PIM\_DC,C}$) is preferably calculated by the MCP 108 of FIG. 1 using measured alternating currents (AC) and calculated duty ratios from the PIM 106.

The current sum value ($I_{sum}$) calculated in step 216 serves as an indication of whether the various current sensors 109 of FIG. 1 are healthy. If all of the current sensors 109 are healthy, then the current sum value ($I_{sum}$) of step 216 should be approximately equal to zero. The current sum value ($I_{sum}$) is preferably calculated in step 216 by the MCP 108 of FIG. 1 for use in the diagnostic algorithm performed in step 218 and described below with reference to FIG. 5.

The performance diagnostic algorithm is performed (step 218). The performance diagnostic algorithm is depicted in FIG. 5 in accordance with an exemplary embodiment, and will be described below in connection therewith.

Figure 5:
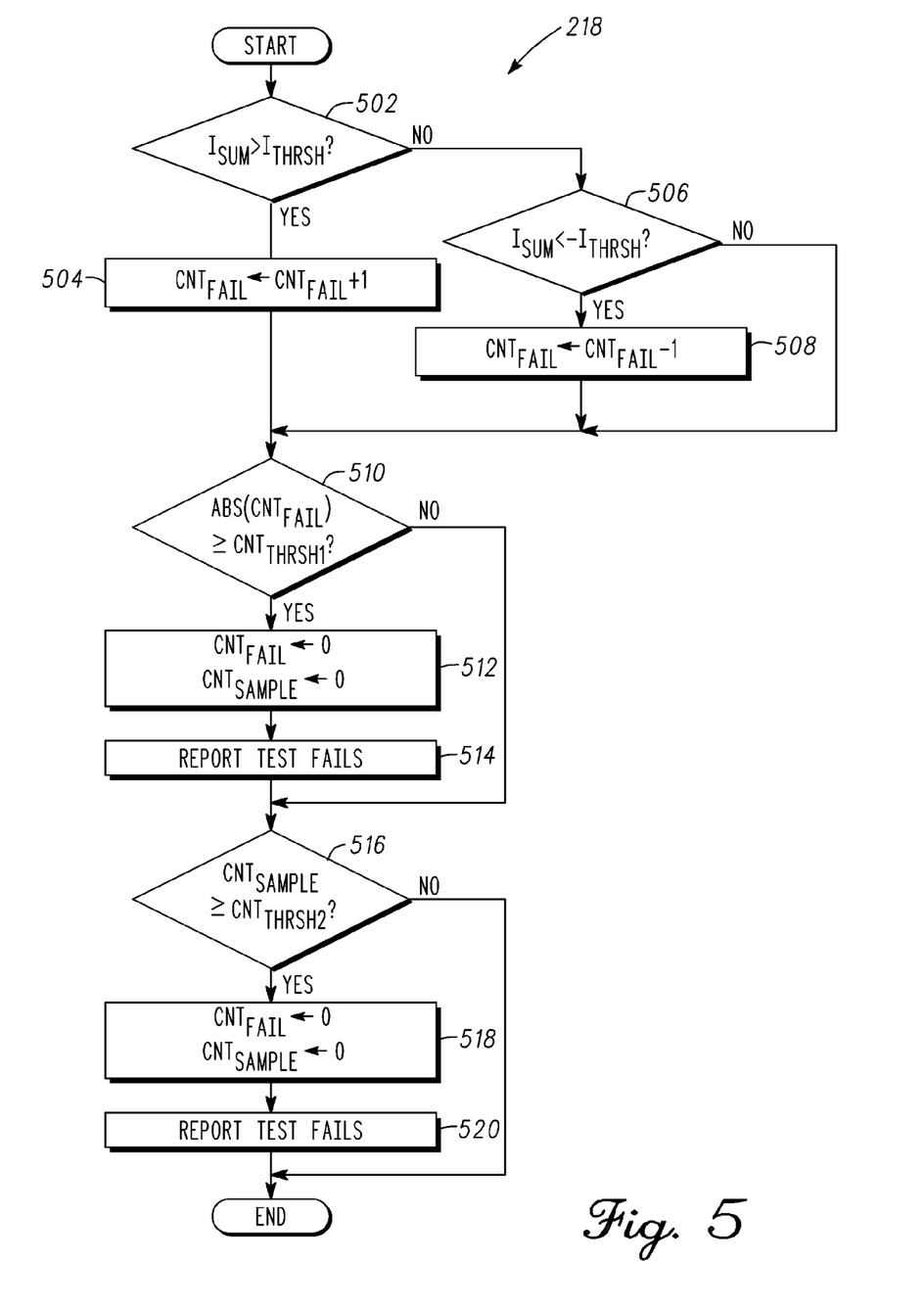
FIG. 5 is a flowchart of a sub-process of the process of FIG. 2, namely a sub-process for performing a diagnostic algorithm for current sensor faults, in accordance with an exemplary embodiment.

As depicted in FIG. 5, the performance diagnostic algorithm of step 218 begins with the step of determining whether the current sum value ($I_{sum}$) of step 216 is greater than a positive current threshold ($I_{thrsh}$) (step 502). The positive current threshold ($I_{thrsh}$) may be equal to approximately positive thr twenty amperes (+20 amps). However, this may vary. This determination is preferably made by the MCP 108 of FIG. 1.

If it is determined in step 502 that the current sum value ($I_{sum}$) is greater than the positive current threshold ($I_{thrsh}$), then a fail counter ($CNT_{fail}$) is incremented by one (step 504). The fail counter ($CNT_{fail}$) serves as a measure of how many instances out of the sample size represent failures of the current sensors 109 of FIG. 1 and/or other indications that one or more of the current sensors 109 are unhealthy (in other words, not operating properly). The fail counter ($CNT_{fail}$) is preferably incremented in step 504 by the MCP 108 of FIG. 1. The process then proceeds to step 510, described further below.

Conversely, if it is determined in step 502 that the current sum value ($I_{sum}$) is less than or equal to the positive current threshold ($I_{thrsh}$), then a, determination is made as to whether the current sum value ($I_{sum}$) of step 216 is less than a negative current threshold ($-I_{thrsh}$) (step 506). The negative current threshold ($I_{thrsh}$) may be equal to approximately negative twenty amperes (−20 amps). However, this may vary. This determination is preferably made by the MCP 108 of FIG. 1.

If it is determined in step 506 that the current sum value ($I_{sum}$) is less than the negative current threshold ($-I_{thrsh}$), then the fail counter ($CNT_{fail}$) is decremented by one (step 508). The fail counter ($CNT_{fail}$) is preferably decremented in step 584 by the MCP 108 of FIG. 1. The process then proceeds to step 510, described below.

During step 510, a determination is made as to whether an absolute value of the fail counter ($CNT_{fail}$) is greater than or equal to a first counter threshold ($CNT_{trsh1}$). The first counter threshold ($CNT_{trsh1}$) may be a fixed value, such as three, by way of example only. Alternatively, the first counter threshold ($CNT_{thrsh1}$) may be dependent upon the sample count ($CNT_{sample}$), such as three failures out of every five samples, by way of example only. Other values and/or types of values may be used for the first counter threshold ($CNT_{thrsh1}$). The determination of step 510 is preferably conducted by the MCP 108 of FIG. 1.

If it is determined in step 510 that the absolute value of the fail counter ($CNT_{fail}$) is greater than or equal to the first counter threshold ($CNT_{trsh1}$), then one or more of the current sensors 109 of FIG. 1 are determined to be unhealthy, and the fail counter ($CNT_{fail}$) and the sample counter ($CNT_{sample}$) are both set equal to zero (step 512). The re-setting of the fail counter ($CNT_{fail}$) and the sample counter ($CNT_{sample}$) is preferably performed by the MCP 108 of FIG. 1. Also during step 512, the PIM 106 of FIG. 1 is preferably shut down.

In addition, a report is provided that the test has failed (step 514). This report is preferably provided by the MCP 108 of FIG. 1. The process then proceeds to step 516, discussed further below.

Conversely, if it is determined in step 510 that the absolute value of the fail counter ($CNT_{fail}$) is less than the first counter threshold ($CNT_{thrsh1}$), then the fail counter ($CNT_{fail}$) and the sample counter ($CNT_{sample}$) are not re-set, and the PIM 106 of FIG. 1 is not shut down. Rather, the process proceeds directly to step 516, described below.

During step 516, a determination is made as to whether the sample counter ($CNT_{sample}$) is greater than or equal to a second counter threshold ($CNT_{thrsh2}$). The second counter threshold ($CNT_{thrsh2}$) may be equal to 0.6, by way of example only (for example, in which three or more faulty results out of five sample attempts results in a determination that there is a current sensor fault). The second counter threshold ($CNT_{thrsh2}$) may vary. The determination of step 516 is preferably conducted by the MCP 108 of FIG. 1.

If it is determined in step 516 that the sample counter ($CNT_{sample}$) is greater than or equal to the second counter threshold ($CNT_{thrsh2}$) then one or more of the current sensors 109 of FIG. 1 are determined to be healthy, and the fail counter ($CNT_{fail}$) and the sample counter ($CNT_{sample}$) are both set equal to zero (step 518). The re-setting of the fail counter ($CNT_{fail}$) and the sample counter ($CNT_{sample}$) is preferably performed by the MCP 108 of FIG. 1. Also during step 418, the PIM 106 of FIG. 1 is preferably not shut down.

In addition, a report is provided that the test has passed (step 520). This report is preferably provided by the MCP 108 of FIG. 1. The process then proceeds to step 220 of FIG. 2, discussed further below.

Conversely, if it is determined in step 516 that the sample counter ($CNT_{sample}$) is less than the second counter threshold ($CNT_{thrsh2}$) then the current sensors 109 of FIG. 1 cannot be determined to be healthy. The fail counter ($CNT_{fail}$) and the sample counter ($CNT_{sample}$) are not re-set, and the process proceeds directly to step 220 of FIG. 2, described below.

Returning now to FIG. 2, the results of the diagnostic algorithm of FIG. 5 are utilized in step 220 in a determination of whether the test has passed. This determination is preferably made by the MCP 108 of FIG. 1.

If it is determined in step 220 that the test has not passed, then the motor torque is set equal to zero (step 222). Specifically, because one or more of the current sensors 109 of FIG. 1 are determined to be unhealthy, the PIM 106 of FIG. 1 is shut down by the MCP 108 of FIG. 1, and no motor torque is provided. The process then preferably returns to step 202 in a new iteration.

Conversely, if it is determined in step 220 that the test has passed, then the current sensors 109 of FIG. 1 are determined to be healthy and operating correctly, and a torque command is determined (step 224). The torque command is preferably determined in step 224 by the MCP 108 of FIG. 1 using a look-up table, one or more feedback currents from the current sensors 109 of FIG. 1, and values of other various variables known in the industry, including a motor state, battery voltages, and motor parameters such as inductances of the motor, a number of motor posts, stator resistances, and rotor resistances, among other possible values.

A determination is made as to whether the torque command of step 224 is less than or equal to the motor torque capacity (step 226). The motor torque capacity comprises a current motor torque capacity as most recently determined in step 201, reduced in step 206, or recovered in step 210, whichever step has occurred most recent in time to the determination of step 226. The determination of step 226 is preferably performed by the MCP 108 of FIG. 1.

If it is determined in step 226 that the torque command is less than or equal to the motor torque capacity, then the motor torque is set equal to the torque command (step 228). Conversely, if it is instead determined in step 226 that the torque command is greater than the motor torque capacity, then the motor torque is set equal to the motor torque capacity (step 230). Accordingly, the motor torque capacity serves as an upper limit, or upper bound, on the motor torque provided by the system 100 of FIG. 1. The determination of the motor torque in step 228 or step 230 (whichever of these two steps is conducted in a current iteration) is preferably performed by the MCP 108 of FIG. 1.

The motor torque is then provided in accordance with the determined motor torque magnitude of step 228 or step 230 (step 232). Specifically, if the motor torque was set equal to the torque command in step 228, then the MCP 108 of FIG. 1 adjusts the pulse width modulation signals to the PIM 106 of FIG. 1 in order to provide electric power to the electric motor 110 of FIG. 1 in an amount equal to the torque command. Conversely, if the motor torque was set equal to the motor torque capacity in step 230, then the MCP 108 of FIG. 1 adjusts the pulse width modulation signals to the PIM 106 of FIG. 1 in order to provide electric power to the electric motor 110 of FIG. 1 in an amount equal to the motor torque capacity.

The systems and methods described herein provide for potentially improved motor torque control for hybrid vehicles. For example, when a communications bus is unhealthy, motor torque is provided in accordance with a reduced capacity, dependent also upon the mode of operation of the system and the motor speed. The reduced capacity for the motor torque helps to ensure that the system provides the necessary power to operate the vehicle but also stays within a safe range of operation even when the communications bus is not healthy. Accordingly, the system inverter need not be shut down when the communications bus is not healthy, as would be the case in typical hybrid systems.

It will be appreciated that the disclosed methods and systems may vary from those depicted in the Figures and described herein. For example, as mentioned above, the system 100 of FIG. 1 may be disposed in whole or in part in any one or more of a number of different vehicle units, devices, and/or systems. In addition, it will be appreciated that certain steps of the process 200 and/or sub-processes thereof may vary from those depicted in FIGS. 2-5 and/or described herein in connection therewith. It will similarly be appreciated that certain steps of the process 200 and/or sub-processes thereof may occur simultaneously or in a different order than that depicted in FIGS. 2-5 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles and/or environments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling motor torque in a hybrid vehicle having a motor and a communications bus, the method comprising the steps of:
controlling the motor torque using a first motor torque capacity if the communications bus is healthy, the first motor torque capacity having a first absolute value; and
controlling the motor torque using a second motor torque capacity if the communications bus is unhealthy, the second motor torque capacity having a second absolute value that is less than the first absolute value.

2. The method of claim 1, further comprising the steps of:
determining an operating mode for the hybrid vehicle; and
determining the second motor torque capacity using the operating mode.

3. The method of claim 1, further comprising the steps of:
measuring a speed of the motor; and
determining the second motor torque capacity using the speed.

4. The method of claim 3, wherein the second absolute value is less than the first absolute value only when the speed is less than a predetermined speed threshold.

5. The method of claim 3, further comprising the step of:
determining an operating mode for the hybrid vehicle;
wherein the step of determining the second motor torque capacity comprises the step of determining the second motor torque capacity using the speed, the operating mode, and a relationship relating the speed, the operating mode, and the second motor torque capacity.

6. The method of claim 1, further comprising the steps of:
measuring a feedback current from a current sensor; and
determining a torque command using the feedback current for use in controlling the motor torque.

7. The method of claim 6, wherein:
the torque command has a third absolute value; and
the step of controlling the motor torque using the second motor torque capacity comprises the steps of:
controlling the motor torque using the second motor torque capacity if the communications bus is unhealthy and the third absolute value is greater than the second absolute value; and
controlling the motor torque using the torque command if the communications bus is unhealthy and the third absolute value is less than the second absolute value.

8. A method for controlling motor torque in a hybrid vehicle having a motor and a communications bus, the method comprising the steps of:
generating a bus determination as to whether the communications bus is healthy;
determining a motor torque capacity using the bus determination; and
controlling the motor torque using the motor torque capacity.

9. The method of claim 8, further comprising the step of:
measuring a speed of the motor;
wherein the step of determining the motor torque capacity comprises the step of determining the motor torque capacity using the bus determination and the speed.

10. The method of claim 9, further comprising the step of:
determining an operating mode for the hybrid vehicle;
wherein the step of determining the motor torque capacity comprises the step of determining the motor torque capacity using the bus determination, the speed, the operating mode, and a relationship relating the speed, the operating mode, and the motor torque capacity.

11. The method of claim 8, further comprising the step of:
determining an operating mode for the hybrid vehicle;
wherein the step of determining the motor torque capacity comprises the step of determining the motor torque capacity using the bus determination and the operating mode.

12. The method of claim 8, further comprising the step of:
measuring a feedback current from a current sensor; and
determining a torque command using the feedback current.

13. The method of claim 12, wherein:
the motor torque capacity has a first absolute value;
the torque command has a second absolute value; and
the step of controlling the motor torque using the motor torque capacity comprises the steps of:
controlling the motor torque using the motor torque capacity if the second absolute value is greater than the first absolute value; and
controlling the motor torque using the torque command if the second absolute value is less than the first absolute value.

14. A system for controlling motor torque in a hybrid vehicle having a motor and a communications bus, the system comprising:
a processor configured to be coupled to the communications bus and to provide signals for controlling a motor torque for the motor:
using a first motor torque capacity if the communications bus is healthy, the first motor torque capacity having a first absolute value; and
using a second motor torque capacity if the communications bus is unhealthy, the second motor torque capacity having a second absolute value that is less than the first absolute value; and
an inverter in operable communication with the processor and configured to provide the motor torque in accordance with the signals provided by the processor.

15. The system of claim 14, wherein the processor is further configured to:
determine an operating mode for the hybrid vehicle; and
determine the second motor torque capacity using the operating mode.

16. The system of claim 14, further comprising:
a sensor configured to measure a speed of the motor;
wherein the processor is coupled to the sensor and further configured to determine the second motor torque capacity using the speed.

17. The system of claim 16, wherein the second absolute value is less than the first absolute value only if the speed is less than a predetermined speed threshold.

18. The system of claim 16, further comprising:
a memory configured to store a relationship relating the speed, an operating mode for the hybrid vehicle, and the second motor torque capacity;
wherein the processor is coupled to the memory and further configured to:
determine the operating mode for the hybrid vehicle; and
determine the second motor torque capacity using the speed, the operating mode, and the relationship.

19. The system of claim 14, further comprising:
a current sensor configured to provide a feedback current;
wherein the processor is coupled to the current sensor and further configured to determine a torque command using the feedback current.

20. The system of claim 19, wherein:

the torque command has a third absolute value; and the processor is further configured to:

control the motor torque using the second motor torque capacity if the communications bus is unhealthy and the third absolute value is greater than the second absolute value; and     control the motor torque using the torque command if the communications bus is unhealthy and the third absolute value is less than the second absolute value.

* * * * *